Figure 1:
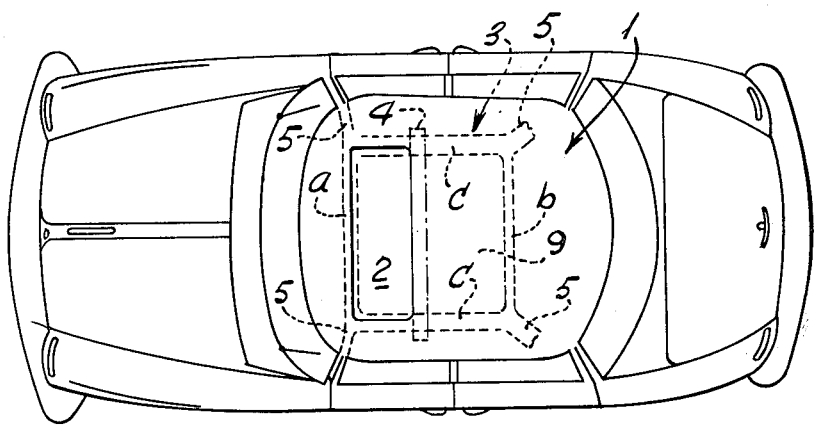

Feb. 19, 1963

J. WERNER 3,078,122

ROOF FRAME FOR STIFFENING THE ROOF
APERTURE OF MOTOR VEHICLES

Filed July 21, 1959

2 Sheets-Sheet 1

INVENTOR.
JOHANNES WERNER

BY

Nolte & Nolte
ATTORNEYS

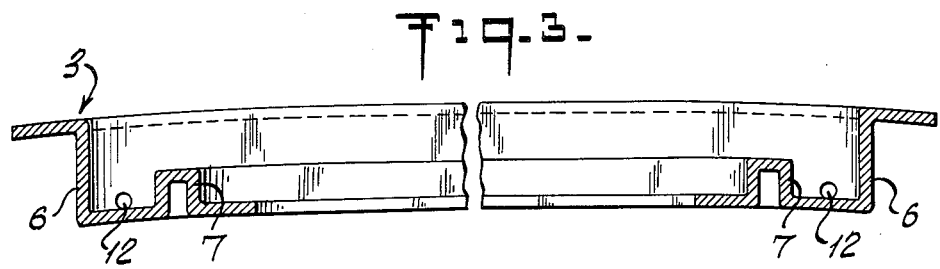
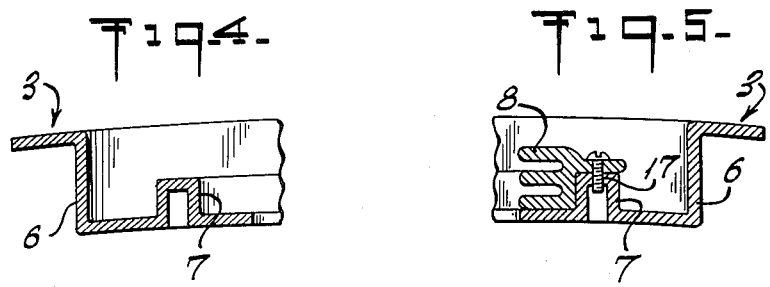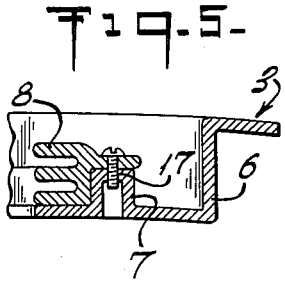
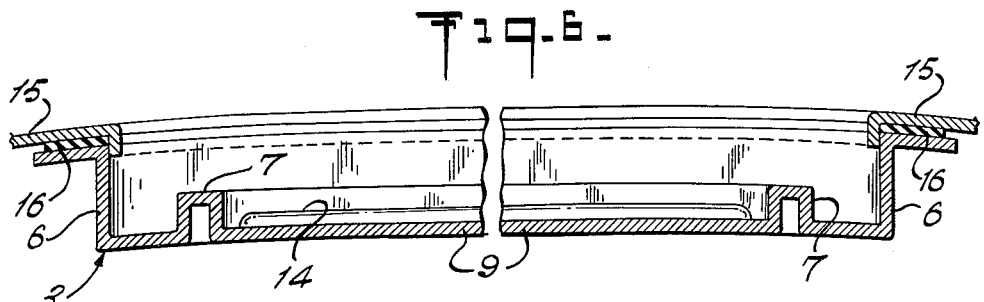
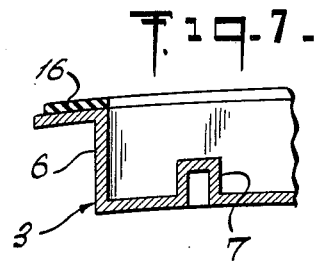
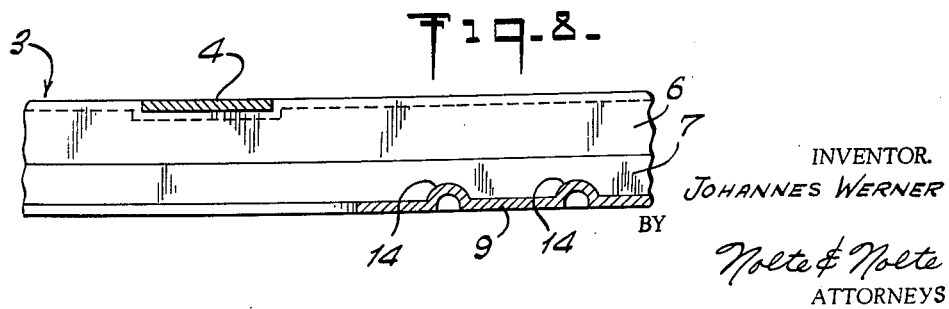

United States Patent Office 3,078,122
Patented Feb. 19, 1963

3,078,122
ROOF FRAME FOR STIFFENING THE ROOF APERTURE OF MOTOR VEHICLES
Johannes Werner, Offenbach (Main), Germany, assignor to H. T. Golde G.m.b.H., & Co. K.G., Frankfurt, Germany
Filed July 21, 1959, Ser. No. 828,548
Claims priority, application Germany July 22, 1958
5 Claims (Cl. 296—137)

The invention relates to a roof frame for stiffening the roof aperture of motor vehicles in which a sliding roof is to be fitted.

Hitherto, roof frames have been assembled by welding from a plurality of section lengths and, after assembly or after fitting in the vehicle, connected e.g. by welding to the vehicle roof or to the roof supports. In these arrangements there is provided, more particularly for rigid sliding roofs, a frame part which surrounds the roof aperture and which determines the dimensions of the finished roof aperture.

Since the sections may become somewhat distorted during welding and since irregularities in the welded seams must be taken into account, with known frames difficulties are caused owing to manufacturing tolerances during the assembly of the frame to the roof, and these must be compensated for in some cases by special arrangements and/or adjustment of the guides for the sliding roof. Moreover, it must be anticipated that welded seams do not all have the same quality as one another, so that subsequent checking is necessary if complaints are to be avoided.

The object of the invention is to provide a frame which is easy to manufacture, has great stability and extremely accurate dimensions and also permits considerable simplification as regards the work necessary for arranging the said frame in the vehicle, and therefore it proposes constructing the frame so that its front and rear transverse portions and the two side portions, and preferably also a transverse reinforcement, are made of one piece.

A roof frame according to the invention is made of one piece and can be produced, e.g., in a deep drawing process. It comprises preferably a Z-section whose upper flange is directed outwardly, and is stiffened by additional profiling at the lower flanges. The frame edges determine the roof aperture, whose rear edge, in the case of a rigid sliding roof, can be bounded by a reinforcing bar which is stiffened in itself and is inserted in the frame and whose ends can serve at the same time as connections for the supports associated with the lateral roof bearers of the body frame.

All the holes for the necessary fittings can be provided with extremely small tolerances in this frame during its manufacture, so that subsequent processing or adjustment is not necessary after fitting to the vehicle. This frame can be made in one piece with a central transverse reinforcement which with hitherto known frames was arranged below the frame section members and thus reduced the head room inside the vehicle.

With a frame made in one piece it is possible for the channel-like portions of the frame used for conveying water away to be so constructed as to have a gradient greater than the normal roof curvature without requiring additional space which would reduce the head room inside the vehicle, which is not possible in hitherto known frame constructions assembled by welding from individual section members. Moreover, a frame according to the invention can be made water-tight without difficulty.

It is also possible to provide the sections of the frame with a bearing surface adapted to the roof curvature in both directions, and this bearing surface can be substantially enlarged as compared with the hitherto known constructions, so that it is simpler to connect to the fixed vehicle roof. A roof frame of this kind has also the advantage that it can be constructed with rounded-off corners, without having to weld-on additional parts for this purpose as has been the practice hitherto. The novel construction is more stable than frames assembled by welding from individual sections, more particularly at the corners.

The Z-section which is preferably to be used permits simple connection by welding to the edges of the roof aperture, which need only be bent-over downwards through 90°.

The roof frame according to the invention can easily be produced in large numbers in a very short time and with very small tolerances, and its fitting to a vehicle requires only a fraction of the time hitherto required for this work.

Figure 2:
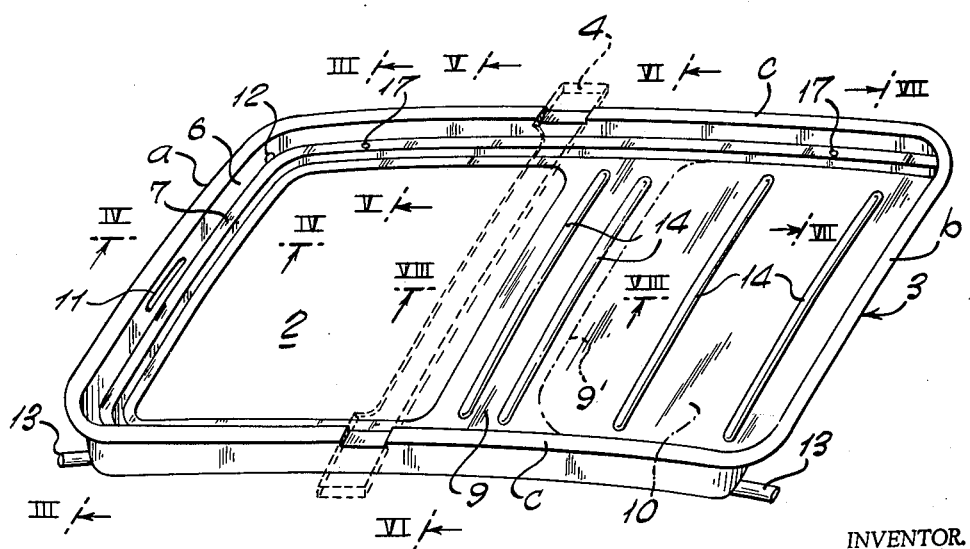

One example of embodiment of the invention will be explained hereinafter with reference to the drawings, wherein:

FIGURE 1 is a diagrammatic view of the arrangement of a roof frame in the roof of a motor vehicle having a sliding roof portion, FIGURE 2 is a perspective view of one form of embodiment of a roof frame, FIGURE 3 is a sectional view taken on the line III—III of FIGURE 2, FIGURE 4 is a sectional view taken on the line IV—IV of FIGURE 2, FIGURE 5 is a sectional view taken on the line V—V of FIGURE 2, FIGURE 6 is a sectional view taken on the line VI—VI of FIGURE 2, FIGURE 7 is a sectional view taken on the line VII—VII of FIGURE 2, and FIGURE 8 is a sectional view taken on the line VIII—VIII of FIGURE 2.

The roof 1 of a motor vehicle is provided with a roof aperture 2, e.g., for a rigid sliding roof. Guide rails are to be provided at the longitudinal sides of the roof aperture 2 for guiding a sliding or a folding roof. A sliding roof of this kind is described in more detail in a copending patent application of Hans Golde et al., Ser. No. 828,484, filed on even date and coassigned with the present application. The sectional view of FIG. 3 of said copending application shows the sliding roof 1 displaceable along guide rails 3, the latter being identified in the present case by numeral 8 while the sliding roof has been omitted from the drawings for the sake of clarity.

The roof which is weakened by the aperture therein must be stiffened, and for this purpose the roof frame 3 is connected to the rigid vehicle roof. It is also possible to arrange guide rails for the sliding roof in an appropriate manner on this roof frame 3 also.

This roof frame 3, as FIGURE 2 shows in a perspective view, is made according to the invention with its front (a) and rear (b) transverse portions and also the two side portions (c) in one piece, by deep drawing, pressing or the like. Also made in one piece with this frame is a transverse reinforcement 9 which may extend approximately to the line 9', but in the illustrated example of embodiment fills up the entire rear portion of the frame.

The rear edge of the roof aperture 2 is defined and stiffened by a reinforcing bar 4 which is connected to the frame 3 e.g. by welding. The frame preferably comprises at the places where this reinforcing bar is to be fixed a recess adapted to the cross-section of this bar, or at least a special marking. If the reinforcing bar is made to extend right along the frame, as indicated in dotted lines in FIGURES 1 and 2, a recess is necessary to permit uniform bearing of the metal sheeting of the roof on the upper frame surface which is formed by the outwardly projecting flange of the frame section 3, and on the reinforcing bar 4.

Also made in one piece with the roof frame are frame supports or at least extension flanges 5 (see FIGURE 1) for connection to the pillars of the bodywork or to the roof supports. These frame supports carry the frame and more particularly the rear frame portion which is arranged freely below the roof and which is provided with sound-damping material, e.g. strips of textile material 16 (see FIGURES 6 and 7).

The frame itself according to the invention comprises in general a Z-shaped section 6 whose lower inwardly projecting flange is preferably connected to an upwardly projecting U-section 7. This U-section is used as a support for a guide rail 8 which is shown in FIGURE 5. This guide rail 8 is connected in any desired manner to the said U-section, for example by screws, for which holes 17 are provided at predetermined points in the U-section 7. In the illustrated preferred embodiment, the U-section is continuous from one side portion (c) to the other but does not extend along the rear portion (b) of the frame 3. The space between the said U-section 7 and the web of the Z-section 6 is used for conveying away any rain water which penetrates between the sliding roof and the fixed vehicle roof. This water guide was given a uniform cross-section throughout from the front to the rear with hitherto used section members, since in order to make manufacture less expensive these profiled strips were either rolled or extruded. With the roof frame according to the invention, however, this water discharge guide (rain gutter) can be of any desired shape, for example it can be kept particularly flat in the middle of the roof frame and be additionally deepened outwardly towards the front and rear ends of the frame, approximately in the form shown in FIGURES 5 to 7. In this way there is obtained a gradient which goes beyond the amount of roof curvature, without substantially restricting the free space within the vehicle.

A further saving of space is obtained in that the central transverse reinforcement 9 is made in one piece with the roof frame itself.

As FIGURE 2 shows, all the corners of the roof frame 3 are rounded off, which guarantees better acceptance of stresses.

Hitherto, an opening 10 (shown in dot-dash lines in FIG. 2) in the frame rearwardly of the transverse reinforcement 9 or the line 9' was lined after the fitting of the frame in the vehicle roof with cardboard, metal sheeting or the like from within, since the air entering through the roof aperture is caught in this space situated directly below the roof. Moisture entrained with the air can easily cause distortion of this lining or can cause unsightly spots on the inner lining of the vehicle. The fitting of the lining by means of screws, rivets or spot welding took up a considerable amount of time.

Since after assembly no further work (e.g. fixing the guide rails or the roof drive) need be carried out in the frame according to the invention rearwardly of the roof aperture, this opening 10 can be omitted from the roof frame according to the invention, and this imparts to the frame and thus to the vehicle roof an additional strength owing to the shell-like construction which is provided, and provides a water-tight seal rearwardly of the roof aperture, and also permits simple fastening of the inner lining (stretching or the like) of the motor vehicle.

In the case of a folding roof, a roof frame according to the invention is not given a transverse reinforcement 9 or a reinforcing bar 4, but instead can be provided with a shortened filling in the region of the hitherto conventional opening 10, said filling closing off the folded layers of material from within when the roof is opened.

All the holes which have to be provided in the frame for fitting the sliding roof, the roof drive, and the roof locking system, can be executed in series production and with extremely small tolerances. For the sake of clarity, FIGURE 2 shows only a slot 11 provided for the roof locking system at the left-hand front side of the roof frame 3. Holes 12 are also provided for the water discharge, and the discharge ducts 13 can be connected to these holes, e.g. by welding.

The central transverse reinforcement 9 can be provided with stiffening indentations 14.

The roof frame does not need to have the same cross-section throughout, but can have a different cross-section at different sides or along some portions, in accordance with requirements. Thus, for example, it is not necessary for the U-section 7 to extend along the rear transverse part (b) of the roof frame, which does not require any special reinforcement.

The frame 3 can be connected to the vehicle roof 1 e.g. by spot welding. The roof edge 15 bounding the roof aperture is so flanged-over inwardly for example, as shown in FIGURE 6, that it bears against the section 6 of the roof frame 3 and can then be connected to the frame by spot welding. Since in a frame made in one piece according to the invention practically no deviations from the desired dimensions can occur, in contrast to the hitherto conventional frames assembled by welding, the roof apertures provided are also of very close tolerances, so that the air gaps between the sliding roof and the roof aperture can be reduced to a minimum.

A roof frame constructed in one piece according to the invention by deep drawing or pressing is adapted to the roof curvature of the motor vehicle in both directions. Since the radii of curvature are always great, for example between 1 and 8 meters, a frame of this kind, shaped for a special roof curvature, can additionally be so deformed without difficulty that it can be adapted to another different roof curvature. This permits production in large series, requiring only one press tool for producing a standard frame, whilst substantially simple pressing or bending tools permit changing the curvature for accurate adaptation to the roof shapes of various vehicle types by subsequent shaping of the frame. In order to permit a greater amount of subsequent deformability, web sections of the frame can be slotted at intervals if necessary (not shown). The subsequently deformed frame can then be secured in its new shape e.g. by welding, by means of reinforcements connected to the slotted web sections. This measure does not substantially impair the strength of the roof frame.

I claim:

1. In a motor vehicle having a roof opening and a roof panel reciprocable in said roof opening, the improvement comprising, in combination, a substantially rectangular integral roof frame for supporting said panel and stiffening said opening, an opening in said roof frame being substantially aligned with said roof opening, said roof frame having two side portions and transverse front and rear portions, all of said frame portions having Z-shaped profile sections and inverted U-shaped profile sections inwardly from said Z-shaped sections along at least two opposite ones of said frame portions, the upper flanges of said Z-shaped sections forming the outwardly directed upper edges of said roof frame while the lower flanges of said Z-shaped sections are connected to said inverted U-shaped sections, said inverted U-shaped and Z-shaped profile sections defining together channel-shaped trough portions providing a water guide, said inverted U-shaped sections being adapted to carry guide rails along said two opposite frame portions to slidably receive the reciprocable roof panel and constitute the inner walls of said trough portions, a substantially planar reinforcing member extending in a direction substantially parallel with that of said roof frame between and integral with said side portions at a lower rearward part of said roof frame, and a transverse reinforcing bar rigidly connected to upper parts of said side portions substantially above the rear end of said frame opening.

2. In a motor vehicle, the improvement according to claim 1, wherein said inverted U-shaped sections have substantially inwardly directed lower bearing flanges for carrying said guide rails inwardly and spaced apart from said water guide so that said inverted U-shaped sections separate said guide rails from said water guide.

3. In a motor vehicle, the improvement according to claim 1, further comprising a frame support member integral with said roof frame and extending outwardly therefrom for supporting said roof frame on the body of the vehicle.

4. In a motor vehicle, the improvement according to claim 1, wherein said Z-shaped sections have vertical sections intermediate said upper and said lower flanges and said vehicle roof has downwardly extending lips at the periphery of said frame opening fastened to said vertical portions.

5. In a motor vehicle, the improvement according to claim 1, wherein said inverted U-shaped sections extend along at least three of said frame portions.

References Cited in the file of this patent

UNITED STATES PATENTS

| | | |
|---|---|---|
| 2,148,318 | Melhado | Feb. 21, 1939 |
| 2,208,712 | Votypka | July 23, 1940 |
| 2,338,309 | Votypka | Jan. 4, 1944 |
| 2,410,332 | Ball | Oct. 29, 1946 |
| 2,481,868 | Philip | Sept. 13, 1949 |